(12) United States Patent
Nicholson et al.

(10) Patent No.: US 7,949,215 B2
(45) Date of Patent: May 24, 2011

(54) APPARATUS FOR SIDE FIRE FIBER LASERS

(75) Inventors: Jeffrey W. Nicholson, Morristown, NJ (US); Paul S. Westbrook, Bridgewater, NJ (US)

(73) Assignee: OFS Fitel, LLC, Norcross, GA (US)

( * ) Notice: Subject to any disclaimer, the term of this patent is extended or adjusted under 35 U.S.C. 154(b) by 248 days.

(21) Appl. No.: 12/105,652

(22) Filed: Apr. 18, 2008

(65) Prior Publication Data
US 2009/0263083 A1 Oct. 22, 2009

(51) Int. Cl.
*G02B 6/34* (2006.01)
*H01S 3/30* (2006.01)
*H01S 3/083* (2006.01)
*H01S 3/08* (2006.01)

(52) U.S. Cl. ............... 385/37; 372/6; 372/94; 372/102

(58) Field of Classification Search .................. 385/37; 372/6, 94, 102
See application file for complete search history.

(56) References Cited

U.S. PATENT DOCUMENTS

| | | | |
|---|---|---|---|
| 5,323,404 A | 6/1994 | Grubb | |
| 5,511,083 A | 4/1996 | D'Amato et al. | |
| 5,991,068 A * | 11/1999 | Massicott et al. | 359/337 |
| 2007/0053634 A1 | 3/2007 | Carver et al. | |

OTHER PUBLICATIONS

"Surface-emitting fiber lasers," Shapira, et al., Optics Express 3929, vol. 14, No. 9, May 1, 2006.

* cited by examiner

*Primary Examiner* — Uyen-Chau N Le
*Assistant Examiner* — Kajli Prince

(57) ABSTRACT

A fiber laser having at least one pair of reflectors coupled to an optical fiber, the at least one pair of reflectors defining an optical cavity between the at least one pair of reflectors and being configured to reflect light within the optical cavity. At least one light pump is coupled to the optical fiber and configured to provide pump light into the optical cavity, and at least one medium is positioned within the optical cavity and configured to generate signal light from the pump light in the optical cavity. Further, at least one grating positioned within the optical cavity and configured to couple the signal light out of the optical cavity.

32 Claims, 8 Drawing Sheets

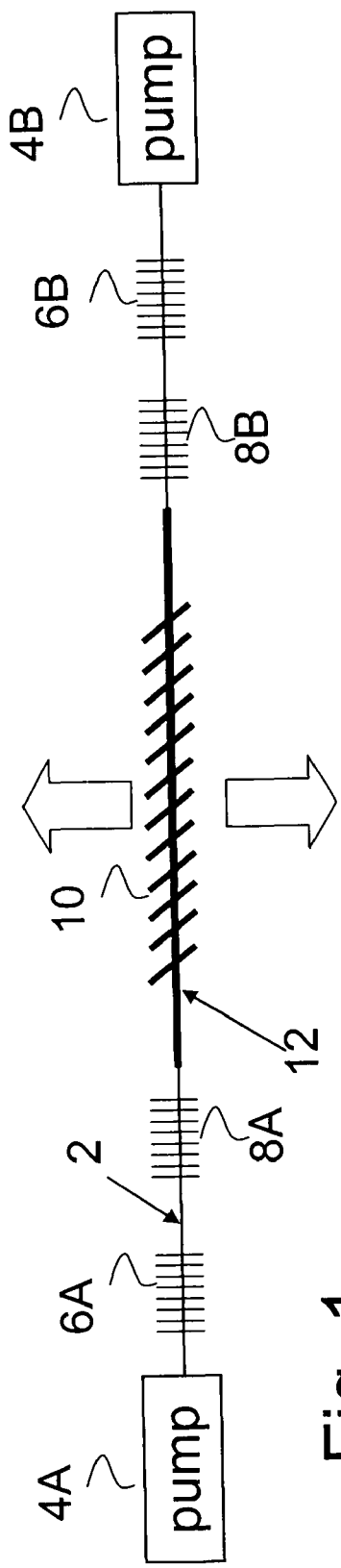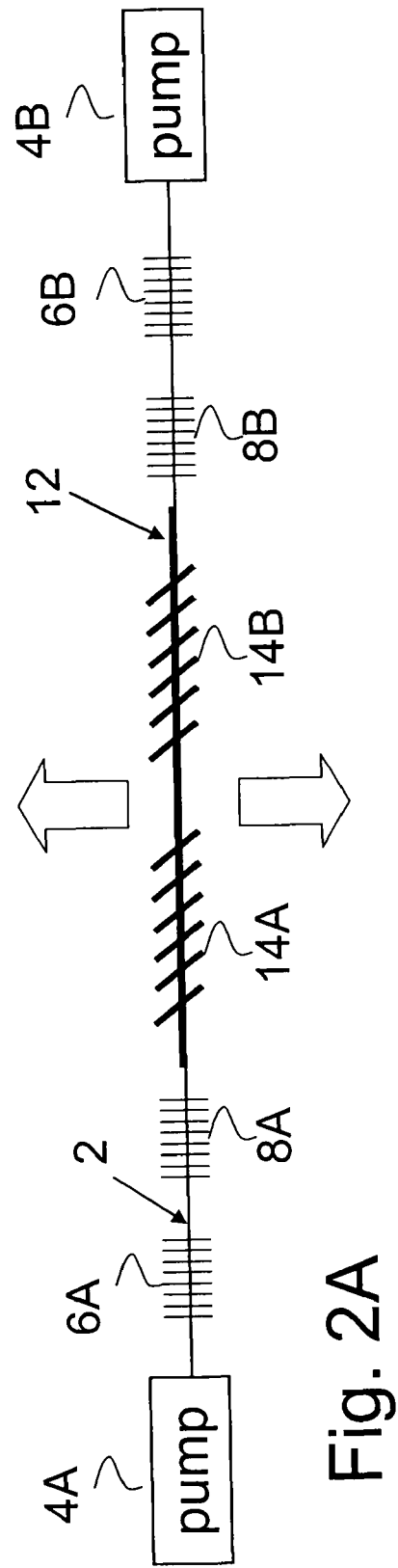

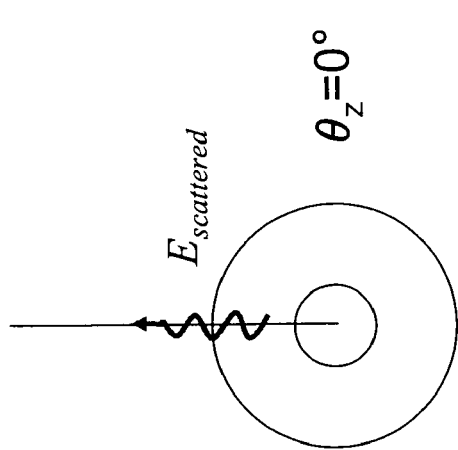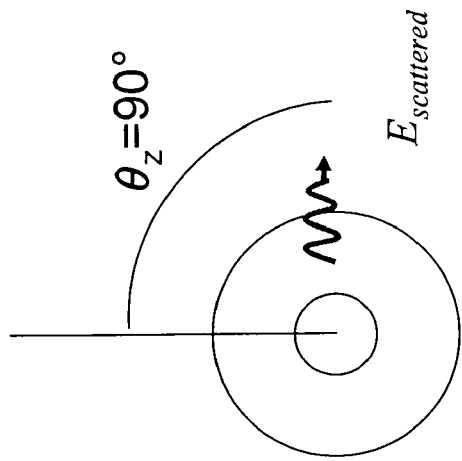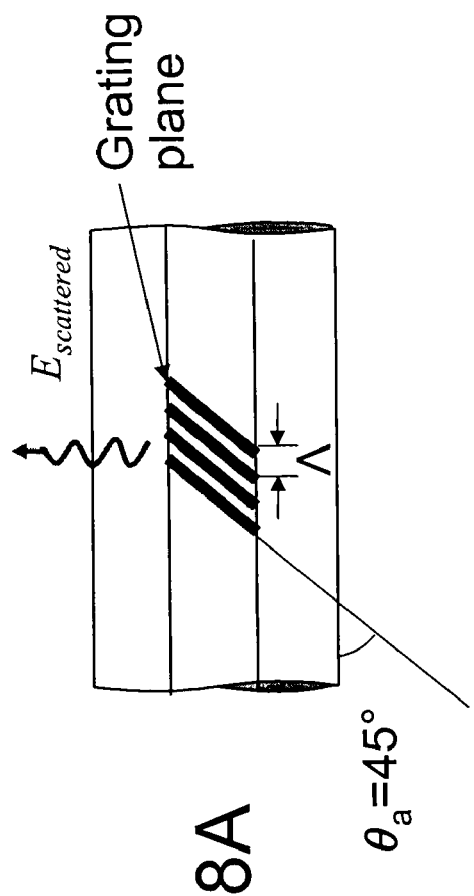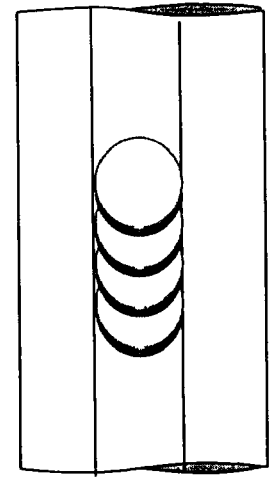
Fig. 8A
Fig. 8B

APPARATUS FOR SIDE FIRE FIBER LASERS

BACKGROUND OF THE INVENTION

1. Field of the Invention

The present invention relates to line light sources and optical fibers. More particularly, the present invention relates to an optical fiber that couples light from the side of the fiber.

2. Discussion of the Background

Various applications utilize line light sources. A line light source can be from a few centimeters to a few meters long, or even longer. Line light sources are used in optical inspection operations that utilize high throughput and therefore, a large, long area of inspection that examines items flowing through this area. Important criteria of line light sources include that they must be uniform, efficient, low cost, reliable, and with minimal extraneous heat generation. Another important criteria in some systems utilizing line light sources is that the line source be highly directional so that all of the light impinges on only one small area. An additional criteria is that the line light source has only certain spectral components.

Current line light sources include arrays of diodes, long halogen lamps, and scattering fibers. One solution uses fibers with tilted gratings imprinted in the fibers. However, this fiber grating solution requires a non-uniform grating strength to arrive at the proper scattered light uniformity since the light is depleted as the light propagates through the grating. Moreover, the grating can couple out only one polarization, making the light sources less efficient. Also, if there is sufficient birefringence along the fiber, the polarization can rotate along the fiber, making the out-coupled power of the light non-uniform. Furthermore, any polarization fluctuations can result in instability of the out-coupled power. Finally, if a narrow band spectrum is required, this must be supplied at the fiber input, and such laser sources can be expensive and inefficient.

SUMMARY OF THE INVENTION

One aspect of the invention includes a fiber laser having at least one pair of reflectors coupled to an optical fiber, the at least one pair of reflectors defining an optical cavity between the at least one pair of reflectors and being configured to reflect light within the optical cavity. At least one light pump is coupled to the optical fiber and configured to provide pump light into the optical cavity, and at least one medium is positioned within the optical cavity and configured to generate signal light from the pump light in the optical cavity. Further, at least one grating positioned within the optical cavity and configured to couple the signal light out of the optical cavity.

According to another aspect of the invention, an optical assembly includes a ring shaped optical cavity formed at least in part from an optical fiber, a pump configured to provide pump light into the ring shaped optical cavity, and a medium positioned within the ring shaped optical cavity and configured to generate signal light from the pump light. A first grating is positioned within the ring shaped optical cavity and configured to couple the signal light out of the ring shaped optical cavity.

In still another aspect of the invention, A fiber laser includes an optical fiber having an optical cavity therein, a light pump configured to provide pump light into the optical cavity and a medium provided within the optical cavity and configured to generate output light from the pump light. A grating is provided in the optical cavity and configured to couple the output light out of the optical cavity.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein:

FIG. 1 illustrates a dual pump laser with a linear cavity;

FIG. 2A illustrates a dual pump laser with a linear cavity with two tilted fiber gratings oriented at the same angle;

FIG. 8A illustrates a side and end view of a side fire fiber laser having a first grating configuration, and light output therefrom;

FIG. 8B illustrates a side and end view of a side fire fiber laser having a second grating configuration, and light output therefrom;

DETAILED DESCRIPTION OF THE PREFERRED EMBODIMENTS

Figure 2B:
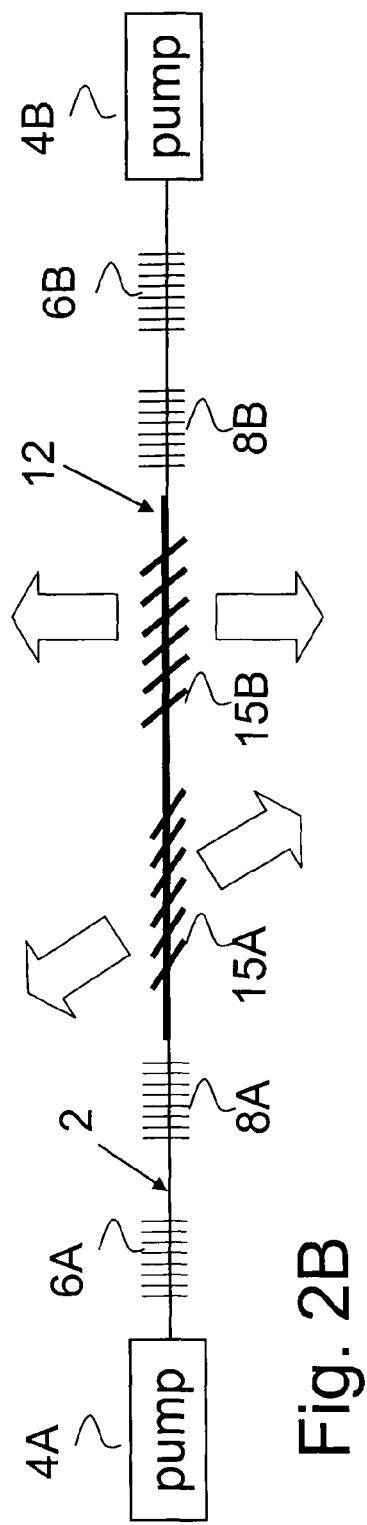
FIG. 2B illustrates a dual pump laser with a linear cavity with two tilted fiber gratings oriented at different angles.

The present inventions are directed to laser configurations that have improved line source features. More particularly, the laser configurations disclosed herein have improved efficiency, better uniformity, less polarization sensitivity, lower cost, and the possibility of single laser line output at one or more laser wavelengths.

Embodiments of the present invention relate to side fire fiber lasers. Side fire fiber lasers include a cavity for generation of light within the cavity. Side fire fiber lasers are also configured to couple light out of the cavity in a particular direction from the side of the fiber laser.

FIG. 1 illustrates a dual pump laser with a linear cavity. The laser includes a fiber 2 that receives light from pumps 4a and 4b. The pumps 4a and 4b can be any desired pump that emits light at any desired power. In an alternative embodiment, a lightly doped fiber or a short length of doped fiber may be used with only one pump laser propagating in a single direction. This arrangement is sufficient to produce a uniform inversion over a long enough length of fiber to be useful. In an embodiment, the laser illustrated in FIG. 1 includes a pair of reflectors such as high reflection gratings 6a and 6b. The pair of reflectors may include a reflector within the fiber or on an end face of the fiber, or include a discrete reflecting component such as a loop mirror. In FIG. 1, a linear cavity is formed between the pair of high reflection gratings 6a and 6b, where each grating is matched in wavelength to give feedback for only that wavelength. For example, light emitted from the pumps 4a and 4b is received by each pair of reflection gratings 6a and 6b, respectively. The reflection gratings 6a and 6b are configured to reflect light at a wavelength $\lambda_a$. Accordingly, the light reflected by the reflection gratings 6a and 6b resonates in the linear cavity formed between reflection gratings 6a and 6b to generate light at the wavelength $\lambda_a$.

In another embodiment, a second pair of reflection gratings 8a and 8b is positioned within the first pair of reflection gratings 6a and 6b. The linear cavity is formed between the pair of high reflection gratings 8a and 8b, where each grating is matched in wavelength to give feedback for only that wavelength. For example, the second pair of reflection gratings 8a and 8b are configured to reflect light at a wavelength $\lambda_b$. Accordingly, the light reflected by the reflection gratings 8a and 8b resonates in the linear cavity formed between reflection gratings 8a and 8b to generate light at the wavelength $\lambda_b$. According to an embodiment, the dual pump fiber laser includes a gain fiber 12 within the linear cavity. The gain fiber 12 is any desired medium that amplifies the light generated in the linear cavity (i.e. gain medium). Accordingly, when light resonates between the high reflection gratings 6a and 6b or 8a and 8b, the gain fiber 12 amplifies the resonated light. While FIG. 1 shows a first and second pair of gratings (6a, 6b and 8c, 8b), this is not necessary to realize the advantages of the present invention. For example, the arrangement of FIG. 1 may exclude the gratings 8a and 8b.

Further, when gain medium absorption is uniform, the gain fiber 12 will provide a substantially uniform gain. Accordingly, under these conditions, a desired uniform output is produced. Additionally, the power of the generated light increases with the length of the linear cavity. However, in the embodiment of FIG. 1, the power of the light between reflection gratings 8a and 8b is not necessarily higher than the power of the light between reflection gratings 6a and 6b since the power of the light between the reflection gratings is dependent on the gain of the gain fiber and the loss at these wavelengths.

According to an embodiment of the present invention, the dual pump laser includes a tilted fiber grating 10 positioned within the linear cavity to couple light out of the laser (i.e., output light or signal light). The position of the tilted fiber grating 10 in the linear cavity may be varied. For example, the tilted fiber grating may be placed uniformly in the cavity such that there is equal spacing between the high reflecting grating 8a and the tilted fiber grating 10 and the high reflecting grating 8b and the tilted fiber grating 10. In another example, the tilted fiber grating may be placed closer to the high reflecting grating 8b than the high reflecting grating 8a. In yet another example, the tilted fiber grating may be placed closer to the high reflecting grating 8a than the high reflecting grating 8b. Further, the high reflectors can also be over written on top of the tilted grating in the same part of the fiber.

Accordingly, the positioning of the tilted fiber grating 10 in the linear cavity determines where the light is coupled out of the laser. Further, it is more advantageous to position the high reflecting gratings closer to or even in the same length of fiber as the tilted fiber gratings to reduce the loss of light scattering out of the fiber.

In general the tilted grating has at least three parameters. These can be understood by considering the grating planes, that is, planes of constant refractive index within core region where the grating index modulation occurs. The three basic parameters are: 1) grating period, $\Lambda$ measured along the axis of the fiber, 2) grating axial angle $\theta_a$, defined as the angle between the grating planes and the fiber axis, and 3) grating azimuthal angle $\theta_z$ defined as the angle that a normal to the grating plane makes around the axis of the fiber. These three parameters are shown in FIGS. 8a and 8b for the case of $\theta_a=45°$ $\theta_z=0°$ and $\theta_a=45°$ $\theta_z=90°$. While these three parameters will determine the orientation of purely planar grating planes, it is also possible for the surfaces of constant index to be non-planar. In this case more and/or different parameters will be needed to specify the grating index modulation, but these definitions can still be used if they are applied to a single radial point in the fiber, such as the center of the fiber. However, the grating scattering from such non-planar gratings may still be used in the present invention. Nor is it necessary that the particular angles in FIGS. 8a and 8b are used in the present invention, however, these angles will be discussed in the embodiments below.

The light scattering by the grating for incident core guided light of a given wavelength $\lambda$ will be determined by the three parameters as follows: 1) $\Lambda$ determines the axial angle at at which light will be scattered. 2) $\theta_a$ determines the strength of the scattered light. If $\theta_a$ is adjusted so that a mirror reflection off of the grating plane is aligned with the light scattering direction determined by $\Lambda$, the light scattering will be close to the most efficient possible for a given index modulation. 3) $\theta_z$ determines the azimuthal angle at which the light will scatter from the grating. This is indicated in FIGS. 8a and 8b by the scattered light undulating line. Polarization dependence is determined by the axial angle of the light scattering. If the axial angle is close to 0° (forward) or 180° (backward), then there will be very little difference in scattering efficiency for the two polarizations. On the other hand, if the light scatters at an axial angle near 90°, (orthogonal to the fiber) then the difference in scattering efficiency will be a maximum, with light polarized in the direction of scatter having the lowest scattering efficiency. Thus, a grating that a) has a period that scatters light at 90° and that b) has an axial tilt $\theta_a$ of 45° will efficiently scatter only one polarization, i.e., light polarized parallel to the grating planes. The other polarization will pass through such a grating with comparatively little scattering. Such a grating can act as an in-fiber polarizer.

A further description of these features may be found in (1) In-line Polarimeter Using Blazed Fiber Gratings, Westbrook P. S. et al., Photonics Technology Letters, IEEE, October 2000, Volume 12, Issue 10, pgs 1352-1354; (2) and U.S. Pat. No. 6,211,957, the entire contents all of which are incorporated by reference herein.

In an embodiment, the tilted fiber grating 10 is formed completely outside of the gain fiber 12. In another example, the tilted fiber grating 10 is formed partially within the gain fiber 12. In yet another example, the tilted fiber grating 10 is formed completely in the gain fiber 12. The preferred configuration is to have the grating entirely in the gain region. In this configuration, the entire gain fiber will scatter light out of the fiber. Further, by having the grating and gain regions overlap, a high degree of control over the polarization and power of the light via the use of the pumps can be achieved.

In another embodiment, the dual pump linear cavity laser includes multiple tilted fiber gratings. For example, FIG. 2A illustrates the dual pump linear cavity laser of FIG. 1 with tilted fiber gratings 14a and 14b. In FIG. 2A, the tilted fiber gratings 14a and 14b have the same azimuthal orientation with respect to the fiber 2. The light generated in the linear cavity follows the orientation of the tilted fiber gratings 14a and 14b and is coupled out of the laser at an angle with respect to the orientation of the tilted fiber gratings 14a and 14b. As another example, in FIG. 2B, the tilted fiber gratings 15a and 15b have different azimuthal and/or axial orientations with respect to the fiber 2. Thus, light generated in the linear cavity can be coupled out of the laser at different azimuthal angles as schematically shown by the different arrow directions in FIG. 2B. It is also possible for these gratings to overlap each other in part or completely. Moreover, it is possible that both the axial and azimuthal angle of the grating is different for the two gratings. Still further, it is possible that the gratings may have different periods as well. The gratings may also have a non-uniform period and they may also have a non-uniform refractive index modulation amplitude profile.

The tilted fiber gratings 14a and 14b (or 15a and 15b) may be placed independent of each other along any position in the linear cavity. For example, tilted fiber grating 14a may be placed closer to grating 8a while the tilted fiber grating 14b may be placed closer to grating 8b. Therefore, the tilted fiber grating 14a couples light out of the laser at a position closer to grating 8a while the tilted fiber grating 14b couples light out of the laser at a position closer to grating 8b. Accordingly, the tilted fiber gratings 14a and 14b may be placed within the linear cavity at any desired position to control where the light is coupled out of the laser. Further, the tilted fiber gratings may also be placed on top of each other.

When the fiber laser has more than one tilted fiber grating, one of the tilted fiber gratings may be configured as previously described to cause the light to be polarized, which can provide coupling advantages such as a reduction in coupling losses due to polarization drift in the laser. This configuration can provide an advantage of controlling the polarization of the laser. Controlling the polarization is important since the polarization of light guided by a fiber can vary as the fiber is moved from one position to another position. However, if a fiber laser has a strong polarizing grating written into the fiber, then the polarization of the lasing light will be forced to occur on the polarization with the least loss regardless of the state of bending or twist of the fiber. If a second, weaker grating is fabricated orthogonally (in the azimuthal direction) to the strong grating, then the weaker grating will couple the light out of the fiber with the preferred lasing polarization. If the fiber is bent or otherwise disturbed, the strong polarizing grating will continue to force the polarization to remain on the axis of the weak grating. In one embodiment, complications due to polarization can be reduced or eliminated by making the entire fiber laser out of polarization maintaining fiber and components, and including a polarization dependent loss, such as a polarizer, in the cavity to force lasing operation on a single desired polarization state.

Figure 3:
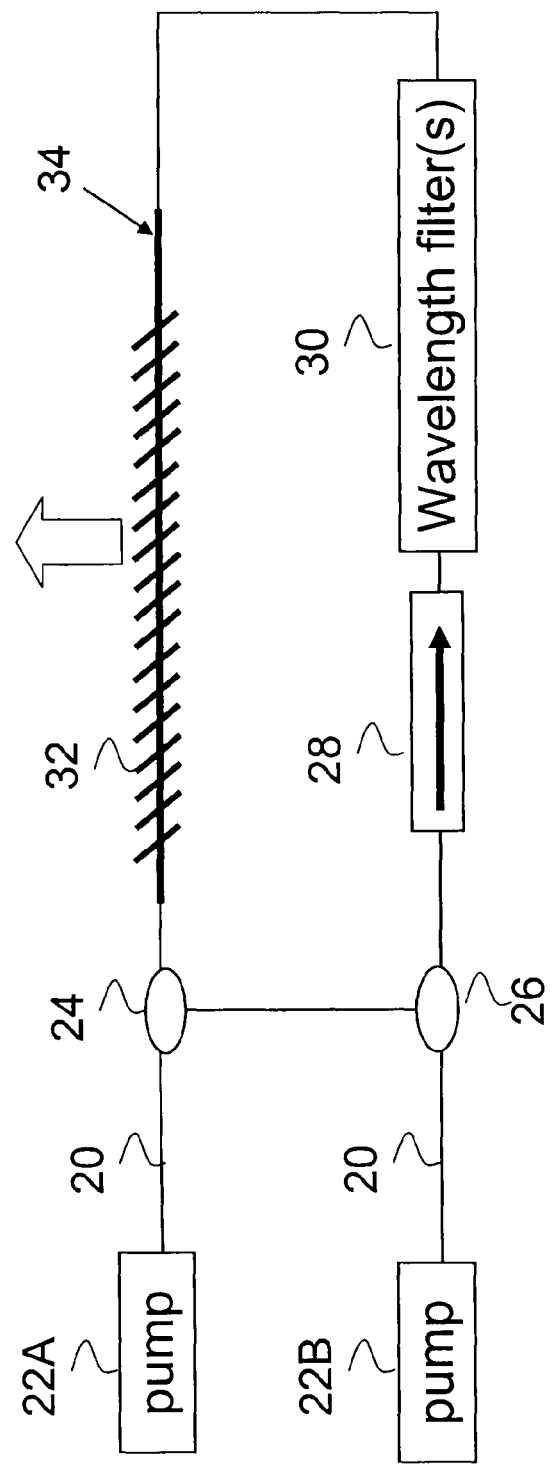
FIG. 3 illustrates a dual pump laser with a ring cavity.

FIG. 3 illustrates another embodiment with a dual pump laser with a ring cavity instead of a linear cavity. This dual pump laser includes a fiber 20 connected to the pumps 22a and 22b. As with the dual pump laser with the laser cavity in FIG. 1, the pumps 22a and 22b emit light. The use of the two pumps 22a and 22b provides uniform excitation of a gain fiber 34 in the ring cavity. While two pumps may be needed to provide uniformity, it is also possible that one pump is sufficient. In this case either 22a or 22b could be eliminated. While dual pumping may be sufficient to provide uniformity in either a linear or ring cavity, it is also possible to have more than two pumps for greater uniformity. Side-pumping or cladding pumping can also be used to couple the pump to the optical fiber.

Light emitted from the pumps 22a and 22b is coupled into the ring cavity by couplers 24 and 26, where the gain fiber 34 amplifies the coupled light. As with the linear cavity embodiment discussed above, ring cavity operation could be performed with a single pump laser and unidirectional pumping. The ring cavity of FIG. 3 includes an isolator 28 that directs the light generated in the ring cavity in one direction. The ring cavity further includes a wavelength filter 30 that filters the light generated in the ring cavity at a desired wavelength. The filter may be a thin film filter, an etalon, a fiber Bragg grating, or any other wavelength filter that can be inserted into a fiber ring cavity. As the filtered light leaves the wavelength filter 30, the light travels to the tilted fiber grating 32, where the tilted fiber grating couples the light out of the ring cavity. Accordingly, light generated in the ring cavity is coupled out of the ring cavity in one direction at a wavelength filtered by the wavelength filter 30. Furthermore, the generated light is coupled out of the ring cavity at an angle with respect to an orientation of the tilted fiber grating 32 with respect to the axis of the fiber 20.

Additionally, the ring cavity includes a gain fiber 34 for amplifying the light generated in the ring cavity. As with the dual pump laser with the linear cavity, the tilted fiber grating 32 may be formed completely out of the gain fiber 34, partially formed in the gain fiber 34, or completely formed in the gain fiber 34. As discussed above for the linear cavity, the preferred configuration is to have the grating entirely in the gain region to provide the highest degree of control over the polarization and power of the light via the use of the pumps. In other embodiments, the dual pump ring cavity laser may include more than one tilted fiber grating in the ring cavity as illustrated in FIGS. 2A and 2B. For example, when the ring cavity includes more than one tilted fiber grating, each tilted fiber grating may have the same orientation with respect to the axis of the fiber as illustrated in FIG. 2A, or each tilted fiber grating may have a different orientation with respect to the axis of the fiber as illustrated in FIG. 2B. Furthermore, the positions of the tilted fiber gratings in the ring cavity may be varied to control where the generated light is coupled out of the ring cavity. For example, one tilted fiber grating may be placed closer to the output coupler 24 while a second tilted fiber grating may be placed closer to the wavelength filter 30. The periods of the gratings may also be different.

In another embodiment, the wavelength filter 30 is a tunable filter. In a tunable filter, the cutoff frequencies of the wavelength can be adjusted to any desired wavelength. For example, during an initial operation of the fiber laser, the wavelength filter 30 may have a cutoff frequency of $f_{c1}$. However, for subsequent operations of the fiber laser, the cutoff frequency of the fiber laser may be adjusted to $f_{c2}$.

In another embodiment, the dual pump ring cavity laser may include more than one wavelength filter. For example, the wavelength filter 30 in FIG. 3 may be replaced with two wavelength filters placed in series. In another embodiment, the wavelength filter 30 may be replaced with two wavelength filters placed in parallel.

Accordingly, when the ring cavity includes more than one wavelength filter, light is coupled out of the ring cavity at the wavelengths filtered by the more than one wavelength filters. Furthermore, when the ring cavity includes more than one wavelength filter, each of the more than one filters may be a tunable filter.

Figure 4:
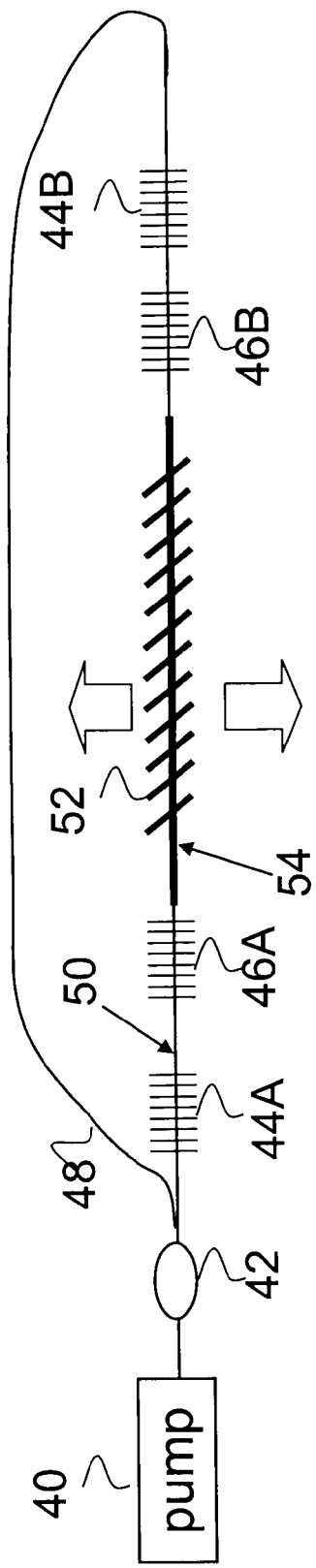
FIG. 4 illustrates a single pump laser with a linear cavity.

In another embodiment, the dual pump laser with linear cavity may be replaced with a single pump laser. FIG. 4 illustrates a single pump laser with a linear cavity with pump 40 that emits light to splitter 42. The splitter splits the light into two directions.

As with the dual pump laser with a linear cavity illustrated in FIG. 1, the single pump laser with a linear cavity includes one or more matching pairs of high reflecting gratings. For example, the laser illustrated in FIG. 4 includes a first pair of high reflecting gratings 44a and 44b, where the linear cavity is formed between this pair of high reflecting gratings. The high reflecting grating 44a is positioned to receive light from the splitter 42 along the fiber 50, where the high reflecting grating 44b is positioned to receive light from the splitter 42 along the fiber 48. Upon receiving the light, the high reflecting gratings 44a and 44b are configured to reflect light except for light at a wavelength $\lambda_a$.

Additionally, the single pump laser with the linear cavity illustrated in FIG. 4 may include a second pair of high reflecting gratings 46a and 46b. The second pair of high reflecting gratings 46a and 46b are configured to reflect light except for light at a wavelength $\lambda_b$.

As with the dual pump laser with the linear cavity illustrated in FIG. 1, the single pump laser with the linear cavity in FIG. 4 includes a tilted fiber grating 52 and a gain fiber 54. The tilted fiber grating may be formed completely out of the gain fiber 54, formed partially in the gain fiber 52, or formed completely in the gain fiber 52.

As with the dual pump laser with the linear cavity illustrated in FIG. 2A, the tilted fiber grating 52 may be replaced with two tilted fiber gratings with the same orientation with respect to the axis of the fiber. Additionally, the tilted fiber grating 52 may be replaced with two tilted fiber gratings with different orientations with respect to the axis of the fiber as illustrated in FIG. 2B. Furthermore, when there is more than one tilted fiber grating, the positions of the tilted fiber gratings may be varied to control where the light is coupled out of the linear cavity.

Figure 5:
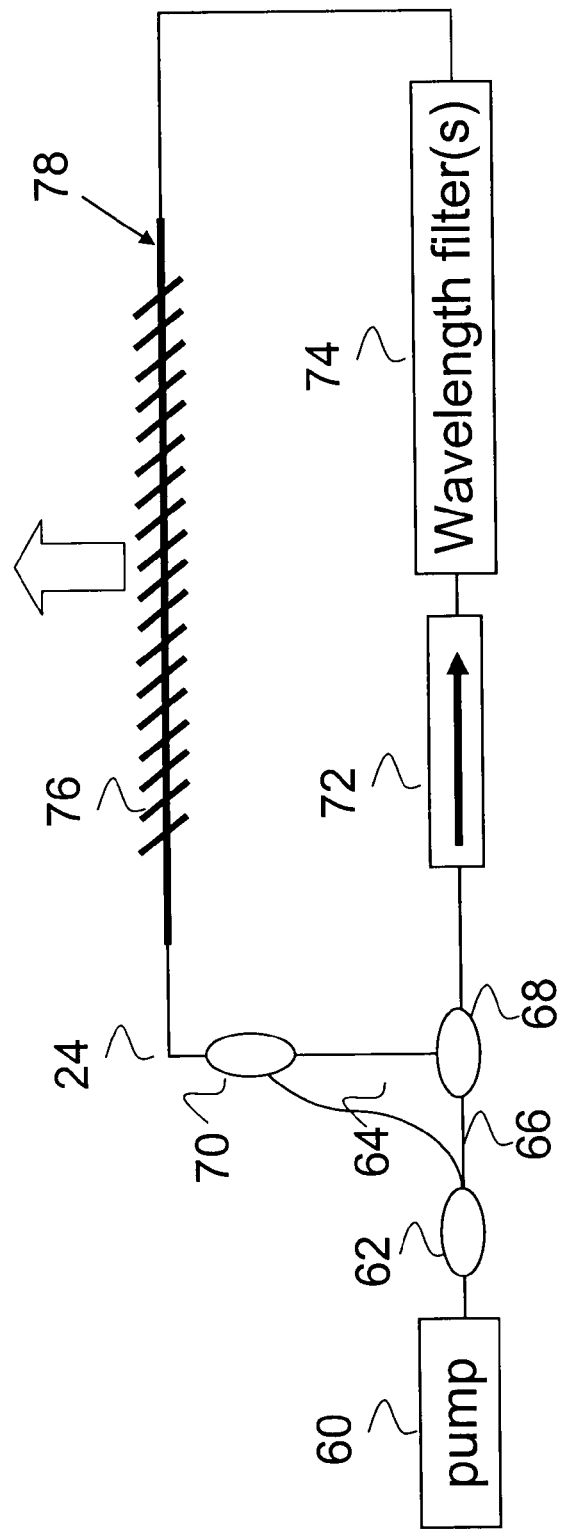
FIG. 5 illustrates a single pump laser with a ring cavity.

FIG. 5 illustrates a single pump laser with a ring cavity. The single pump laser includes a pump 60 that emits light to a splitter 62. The splitter splits the light from the pump 60 along fibers 64 and 66. The light traveling along a fiber 66 is coupled into the ring cavity by coupler 68. The light traveling along a fiber 64 is coupled into the ring cavity by the coupler 70. The isolator 72 and wavelength filter 74 provide the same functions as the isolator 28 and wavelength filter 30 illustrated in FIG. 3. The single pump laser with a ring cavity includes tilted fiber grating 76 and gain fiber 78. The tilted fiber grating 76 may be formed completely out of the gain fiber 78, partially within the gain fiber 78, or completely in the gain fiber 78.

The single pump laser with a ring cavity may include more than one tilted fiber grating as illustrated in FIGS. 2A and 2B. Furthermore, the single pump laser with a ring cavity may include more than one filter as described for dual pump laser with a ring cavity in FIG. 3.

Figure 6:
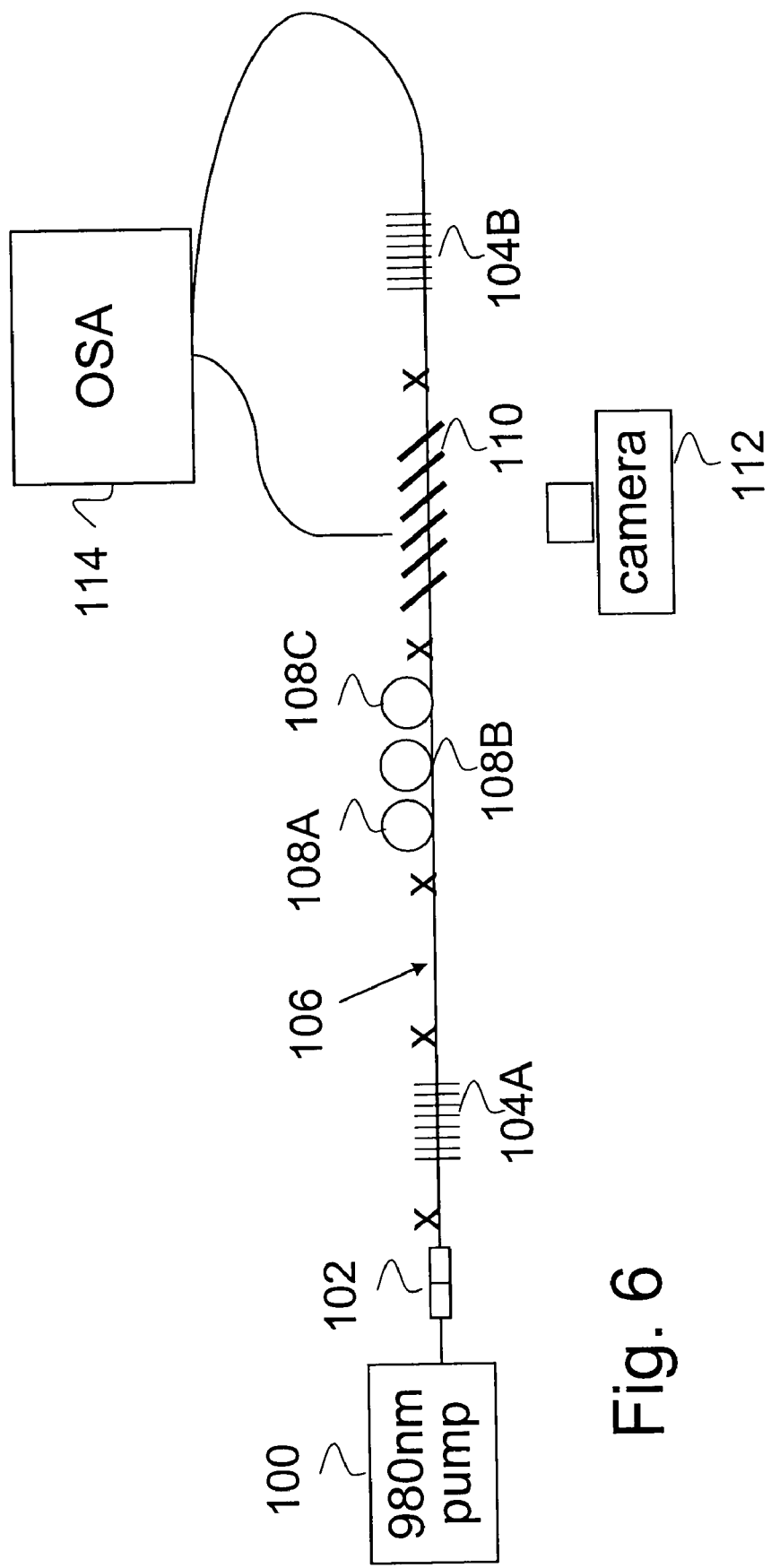
FIG. 6 illustrates a single pump laser with a linear cavity.

FIG. 6 illustrates a specific non-limiting example of a single pump fiber laser with a linear cavity. The cavity is comprised of two highly reflecting gratings 104a and 104b. In this embodiment, these reflecting gratings reflect more than 99.9% of the incident light over a narrow bandwidth centered at 1555 nm. A length of Erbium (Er) doped fiber 106, paddles 108a to 108c, and tilted fiber grating 110 are placed in between the reflecting gratings 104a and 104b. The Er doped fiber 106 is 1.25 m in length. The paddles 108a, 108b, and 108c are used to control the polarization of the light suitably for the tilted fiber grating 110, which is polarization sensitive.

In the embodiment of FIG. 6, the tilted fiber grating 110 is 8 cm long and has a tilt angle of approximately 45° with respect to the axis of the fiber 106. The tilted fiber grating 110 also has a period of approximately 1.07 µm measured along the fiber 106. Accordingly, the tilted fiber grating 110 couples light out of the laser at a wavelength near 1555 nm orthogonally out of the fiber.

A pump 100 operates at a power of 43 mW and emits light at 980 nm. The light emitted from the pump 100 passes through a connector 102, which may be an FC (Fiber Connection) connector or a Fiber Connection Angled Patch Card (FCAPC) connector. Another pump (not shown) is positioned on the other end of the fiber laser and emits light at a wavelength of 980 nm and at approximately the same power as pump 100. Further, an Optical Spectrum Analyzer (OSA) 114 measures the light coupled out of the tilted fiber grating 110, and the light on the fiber side of the laser outside of the optical cavity. Additionally, a camera 112 is used to take a picture of the light coupled out of the tilted fiber grating 110. To measure the grating scattering efficiency near 1550 nm, the grating is tested outside of the laser cavity first. The tested grating is subsequently placed in the cavity. When the laser illustrated in FIG. 6 is pumped with a 1.7 mW laser at 1550 nm, the power density measured along the tilted fiber grating 110 was approximately 49 nW/cm. Results show that the paddles 108A, 108B, and 108C maximized power of the light emitted from the pumps 100 and 114, but did not cause a variation over the grating scattered light.

Figure 7:
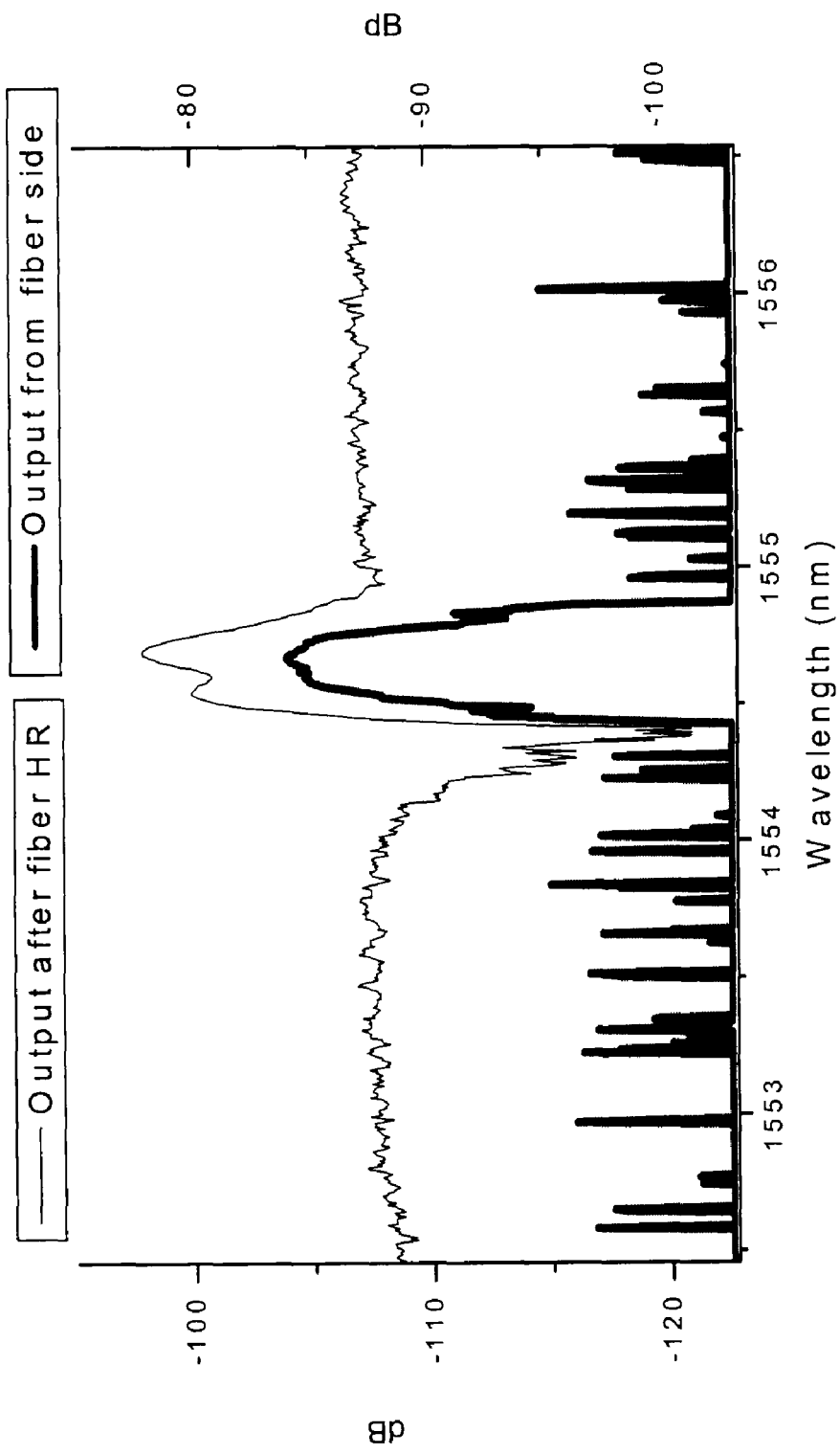
FIG. 7 illustrates an output spectrum of a fiber laser.

FIG. 7 is a chart illustrating the spectrum of light coupled out of the end of side fire fiber laser illustrated in FIG. 6, and the spectrum of light measured from a multi-mode optical fiber placed orthogonal to the tilted grating in the fiber cavity as illustrated in FIG. 6. The thin line in the chart of FIG. 7 represents the output power after the high reflecting grating 104B (left axis). The solid thick line represents the side-firing output power into the multi-mode optical fiber placed next to the side fire fiber laser illustrated in FIG. 6 (right axis). FIG. 7 illustrates that the light coupled out of the side of the side fire laser is lasing near 1555 nm, since the linewidth is narrow and more than 20 dB above the adjacent light. Accordingly, the light coupled out of the side of the side fire fiber laser into the multimode fiber is lasing with a much higher suppression of amplified spontaneous emissions (ASE) compared to light exiting the end of the fiber.

Figure 9A:
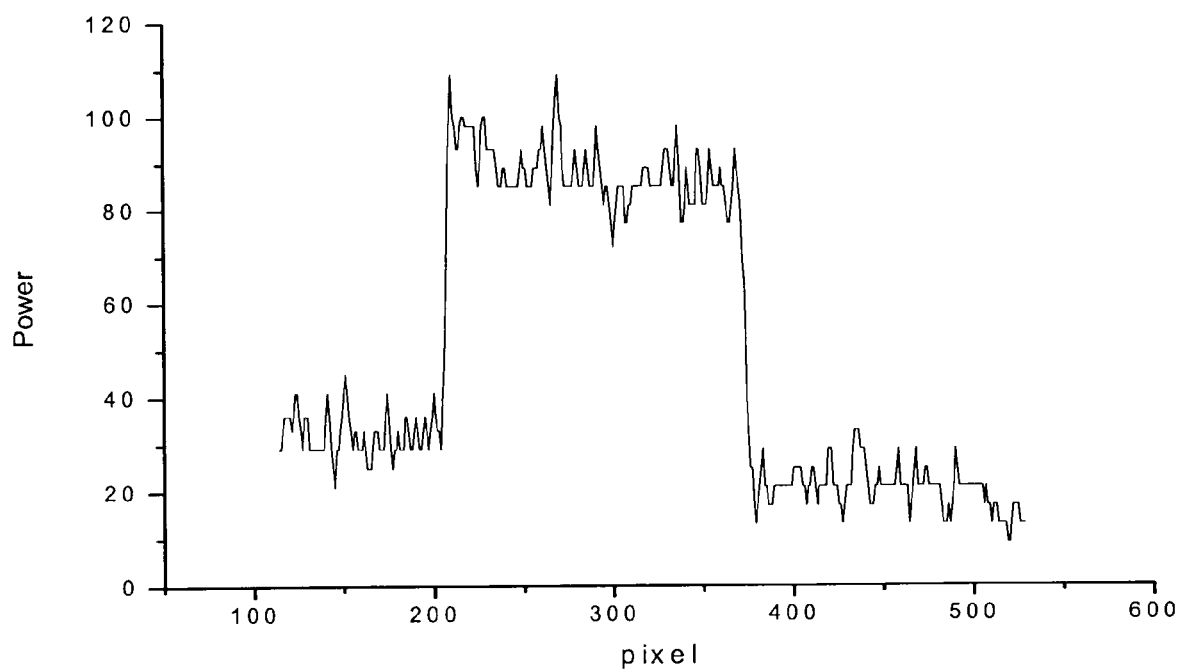
FIG. 9A illustrates a profile of the output beam parallel to the fiber axis.
Figure 9B:
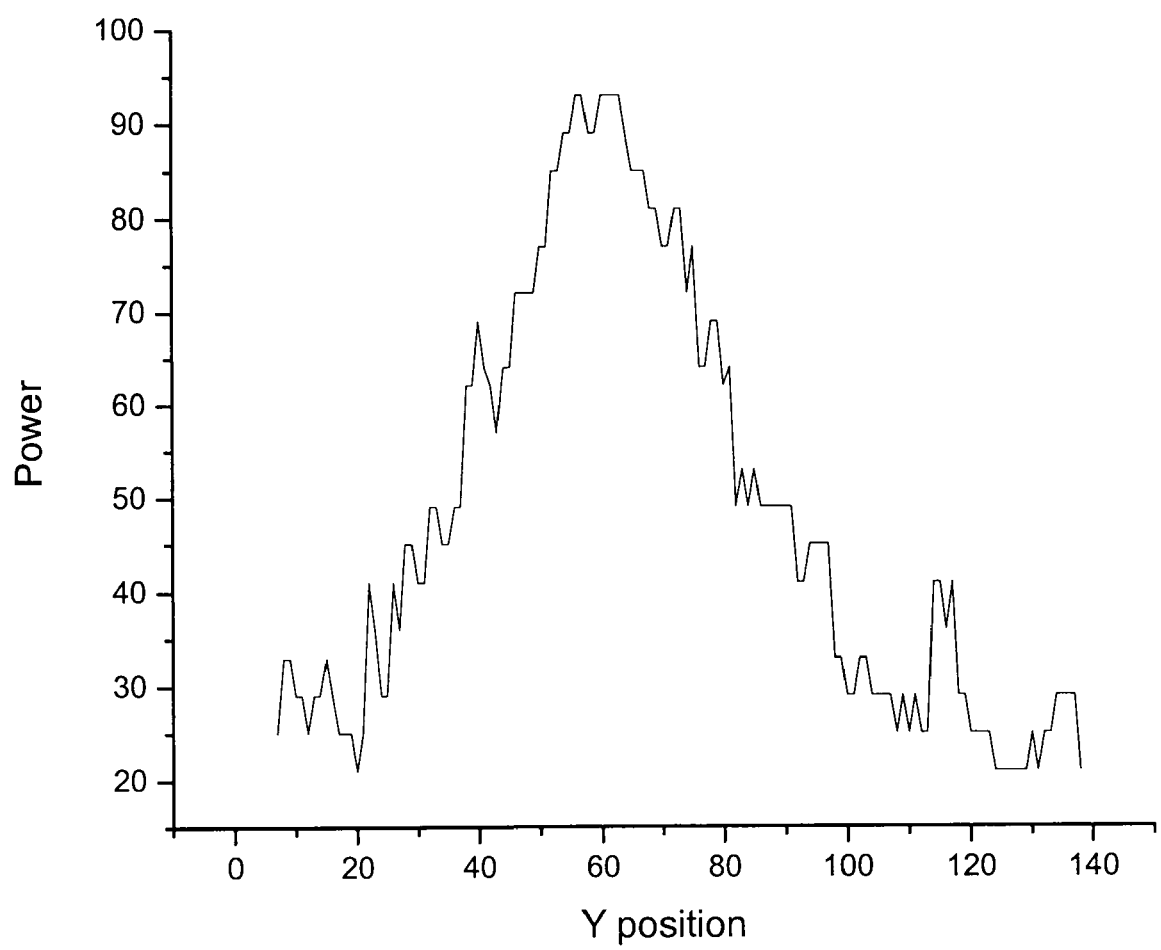
FIG. 9B illustrates a profile of the output beam normal to the fiber axis.

The light coupled out of the titled fiber grating 110 of the side fire fiber laser illustrated in FIG. 6 (i.e., that which was measured by the multimode fiber) is a broad line of light at a substantively constant intensity over the length of the tilted fiber grating 110. FIG. 9A shows a profile of the output beam parallel to the side fire fiber laser illustrated in FIG. 6. FIG. 9A illustrates that the power of the light, generated in the cavity of the laser, along the length of the laser is approximately constant with minimal variation. FIG. 9B shows the profile of the output beam normal to the side fire fiber laser illustrated in FIG. 6. FIG. 9B illustrates the spread of light azimuthally around the fiber, which is normal to the fiber axis. FIG. 9B also illustrates that as the distance increases from both sides of the maximum (i.e., Y-position 0), the power emitted from the side fire fiber laser decreases.

The power measured from the fiber in FIG. 6 was 2.5 µW/cm. As noted above, the 980 pump power was at 43 mW. The ratio of outscattered light per cm to input laser power may be used as a measure of efficiency. Specifically, the fiber laser is operating at a higher efficiency as the outscattered light per cm is increased compared to the input laser power.

For the embodiment illustrated in FIG. 6, the ratio of the power out per cm/the pump power in is $6 \times 10^{-5}$/cm. This ratio is an improvement compared to $3 \times 10^{-5}$/cm for the same grating when not in a laser cavity and simply pumped by a laser at 1550 nm. Thus, the laser cavity converts input optical power into the desired output power at a higher rate, which improves the efficiency of the fiber laser.

Obviously, numerous modifications and variations of the present invention are possible in light of the above teachings. It is therefore to be understood that within the scope of the appended claims, the invention may be practiced otherwise than as specifically described herein.

The invention claimed is:
1. A fiber laser comprising:
   at least one pair of reflectors coupled to an optical fiber, the at least one pair of reflectors defining an optical cavity between the at least one pair of reflectors and being configured to reflect light within the optical cavity;
   at least one light pump coupled to the optical fiber and configured to provide pump light into the optical cavity;

a gain medium positioned within the optical cavity responsive to the pump light, for amplifying optical energy within the optical cavity; and one or more tilted gratings positioned within the optical cavity configured to form a line light source that couples most of the optical energy out of the optical cavity.

2. The fiber laser according to claim 1, wherein the at least one pair of reflectors comprises a first pair of reflecting gratings.

3. The fiber laser according to claim 2, wherein the optical cavity includes a second pair of reflecting gratings formed in the fiber, positioned within the first pair of reflecting gratings and configured to reflect the optical energy within the optical cavity between the second pair of reflecting gratings.

4. The fiber laser according to claim 2, wherein the first pair of reflecting gratings permit light to enter the optical cavity at a wavelength of about 1555 nm.

5. The fiber laser according to claim 1, wherein the one or more tilted gratings is formed at least partially outside of the gain medium.

6. The fiber laser according to claim 1, wherein the one or more tilted gratings is formed at least partially within the gain medium.

7. The fiber laser according to claim 1, further comprising:
a second light pump positioned on another side of the at least one pair of reflectors opposite to the at least one light pump and configured to provide pump light into the optical cavity.

8. The fiber laser according to claim 1, further comprising:
a second tilted grating positioned within the optical cavity and configured to couple the optical energy out of the cavity.

9. The fiber laser according to claim 1, wherein at least one of the reflectors in the at least one pair of reflectors is provided in the fiber or near an endface of the fiber.

10. The fiber laser according to claim 1, wherein the at least one pair of reflectors comprises one or more high reflectors at one end of the gain medium and a single broadband reflector at the other end of the gain medium.

11. The fiber laser according to claim 1, wherein the one or more tilted gratings comprises two tilted gratings, wherein:
each of the two tilted gratings has an axial angle of 45°, a difference between azimuthal angles of the two tilted gratings is 90°, and
a relative strength of the gratings is such that one grating polarizes most of the optical energy in the laser cavity and the other grating causes most of the polarized lasing optical energy to be scattered out the of the fiber.

12. The fiber laser according to claim 1, wherein the one or more tilted gratings comprises a grating that is tilted with a grating plane at 45 degrees with respect to an axis of the fiber.

13. The fiber laser according to claim 1, wherein the length of the one or more tilted gratings is at least a few centimeters.

14. The fiber laser according to claim 1, wherein the intensity of the line light source is substantially consistent over the length of the one or more tilted gratings.

15. An optical assembly, comprising:
a ring shaped optical cavity formed at least in part from an optical fiber;
a pump configured to provide pump light into the ring shaped optical cavity;
a gain medium positioned within the ring shaped optical cavity responsive to the pump light, for amplifying optical energy within the ring shaped optical cavity; and
one or more tilted gratings positioned within the ring shaped optical cavity configured to form a line light source that couples most of the optical energy out of the ring shaped optical cavity.

16. The assembly according to claim 15, wherein the one or more tilted gratings is formed at least partially outside of the gain medium.

17. The assembly according to claim 15, wherein the one or more gratings comprises two tilted gratings, wherein:
each of the two tilted gratings has an axial angle of 45°, a difference between azimuthal angles of the two tilted gratings is 90°, and
a relative strength of the gratings is such that one grating polarizes most of the optical energy in the laser cavity and the other grating causes most of the optical energy to be scattered out the of the fiber along the polarization that is lasing.

18. The assembly according to claim 15, wherein the one or more tilted gratings is formed at least partially within the gain medium.

19. The assembly according to claim 15, further comprising:
a second tilted grating positioned within the ring shaped optical cavity and configured to couple optical energy out of the ring shaped optical cavity at the same angle or a different angle than the one or more tilted gratings.

20. The assembly according to claim 15, further comprising at least one of the followings:
a) an optical coupler configured to receive the pump light emitted from the pump and couple the pump light into the ring shaped optical cavity;
b) an isolator device positioned within the ring shaped optical cavity and configured to direct the optical energy in the ring shaped optical cavity in a single direction; or
c) at least one filter configured to filter the optical energy in the ring shaped optical cavity at a first wavelength.

21. The assembly according to claim 20, further comprising:
one or more second wavelength filters configured to filter the optical energy generated within the ring shaped optical cavity at a second wavelength.

22. The assembly according to claim 15, wherein the pump comprises:
a first pump configured to provide pump light into the ring shaped optical cavity in a first direction; and
a second pump configured to provide pump light into the ring shaped optical cavity in a second direction opposite to the first direction.

23. An optical assembly according to claim 15, wherein the one or more tilted gratings comprises a grating that is tilted with a grating plane at 45 degrees with respect to an axis of the fiber.

24. A fiber laser comprising:
an optical fiber having an optical cavity therein;
a light pump configured to provide pump light into the optical cavity;
a gain medium provided within the optical cavity responsive to the pump light, for amplifying optical energy within the optical cavity; and
one or more tilted gratings positioned within the optical cavity configured to form a line light source that couples most of the optical energy out of the optical cavity.

25. The fiber laser according to claim 24, wherein the optical cavity is a linear cavity formed by a pair of gratings, the gratings configured to reflect the optical energy within the optical cavity.

26. The fiber laser according to claim 25, wherein the light pump is further configured to provide pump light in opposite directions in the linear optical cavity.

27. The fiber laser according to claim 26, wherein the light pump includes two pumps positioned on opposite sides of the optical cavity.

28. The fiber laser according to claim 24, wherein the optical cavity is a ring shaped cavity formed by at least one optical coupler.

29. The fiber laser according to claim 24, wherein the one or more tilted gratings is formed at least partially outside of the gain medium.

30. The fiber laser according to claim 24, wherein the one or more tilted gratings is formed at least partially within the gain medium.

31. The fiber laser according to claim 24, wherein the one or more tilted gratings comprises two tilted gratings, wherein:
    each of the two tilted gratings has an axial angle of 45°, a difference between azimuthal angles of the two tilted gratings is 90°, and
    a relative strength of the gratings is such that one grating polarizes most of the optical energy in the laser cavity and the other grating causes most of the optical energy to be scattered out the of the fiber along the polarization that is lasing.

32. The fiber laser according to claim 24, wherein the one or more tilted gratings comprises a grating that is tilted with a grating plane at 45 degrees with respect to an axis of the fiber.

* * * * *